United States Patent [19]

Rudolph

[11] Patent Number: 5,771,681
[45] Date of Patent: Jun. 30, 1998

[54] AIRCRAFT TURBOFAN ENGINE MIXING APPARATUS

[75] Inventor: Peter K. C. Rudolph, Seattle, Wash.

[73] Assignee: The Boeing Company, Seattle, Wash.

[21] Appl. No.: 710,425

[22] Filed: Sep. 17, 1996

[51] Int. Cl.$^6$ ....................................................... F02K 3/10
[52] U.S. Cl. ....................... 60/262; 60/226.1; 239/265.37
[58] Field of Search ................................. 60/226.1, 226.3, 60/262; 239/265.25, 265.27, 265.37

[56] References Cited

U.S. PATENT DOCUMENTS

| 2,997,845 | 8/1961 | Oulianoff. | |
|---|---|---|---|
| 3,263,931 | 8/1966 | Bartek et al.. | |
| 3,409,228 | 11/1968 | Mehr. | |
| 3,524,588 | 8/1970 | Duval. | |
| 3,550,721 | 12/1970 | Bruner. | |
| 3,613,826 | 10/1971 | Cabassut. | |
| 3,637,041 | 1/1972 | Hilbig. | |
| 3,647,020 | 3/1972 | MacDonald. | |
| 3,664,455 | 5/1972 | Duvvuri. | |
| 3,695,387 | 10/1972 | Hilbig. | |
| 3,774,868 | 11/1973 | Goetz. | |
| 3,897,169 | 7/1975 | Fowler. | |
| 4,095,417 | 6/1978 | Banthin. | |
| 4,165,609 | 8/1979 | Rudolph. | |
| 4,175,640 | 11/1979 | Birch et al.. | |
| 4,215,536 | 8/1980 | Rudolph. | |
| 4,422,524 | 12/1983 | Osborn. | |
| 4,537,026 | 8/1985 | Nightingale. | |
| 4,690,329 | 9/1987 | Madden. | |
| 4,819,876 | 4/1989 | Thayer. | |
| 4,958,489 | 9/1990 | Simmons | ................................. 60/226.3 |
| 5,044,559 | 9/1991 | Russell et al.. | |
| 5,154,052 | 10/1992 | Giffin et al.. | |
| 5,291,672 | 3/1994 | Brown. | |
| 5,343,697 | 9/1994 | Johnson et al. | ......................... 60/226.3 |

OTHER PUBLICATIONS

"The Jet Engine," chapters 6, 14, 15 and 19, Rolls–Royce plc, 1992.

Primary Examiner—Charles G. Freay
Attorney, Agent, or Firm—Christensen O'Connor Johnson & Kindness PLLC

[57] ABSTRACT

A fluid mixing apparatus for mixing primary exhaust and secondary airflow in a turbofan engine with provision for changing the ratio of secondary airflow to primary exhaust cross-sectional areas in the mixing plane. The mixing apparatus includes a segmented annulus (50) attached to the aft end of an engine generator casing (24), the annulus having a plurality of segments of which at least a portion are movable segments (52) hingedly connected to the generator. Each movable segment has an inboard position (54) in which the cross-sectional area ratio is increased and an outboard position (56) in which the ratio is decreased. A number of mixing devices (62) are connected to the segments. A repositioning assembly (96) moves the movable segments between their inboard and outboard positions. A first preferred embodiment of the mixing apparatus includes a number of stationary segments (60) interspersed between the movable segments (52). The mixing devices (62) are attached to the stationary segments (60). A second preferred embodiment of the mixing apparatus includes only movable segments (52), with the mixing devices (62) being attached to the movable segments. Expansion mechanisms (96) are provided between adjacent movable segments, as needed.

23 Claims, 9 Drawing Sheets (PRIOR ART)

AIRCRAFT TURBOFAN ENGINE MIXING APPARATUS

FIELD OF THE INVENTION

This invention relates to aircraft engine primary exhaust nozzles, and more particularly, to aircraft turbofan engines having a mixing plane at which primary exhaust and secondary airflows combine.

BACKGROUND OF THE INVENTION

Figure 1:
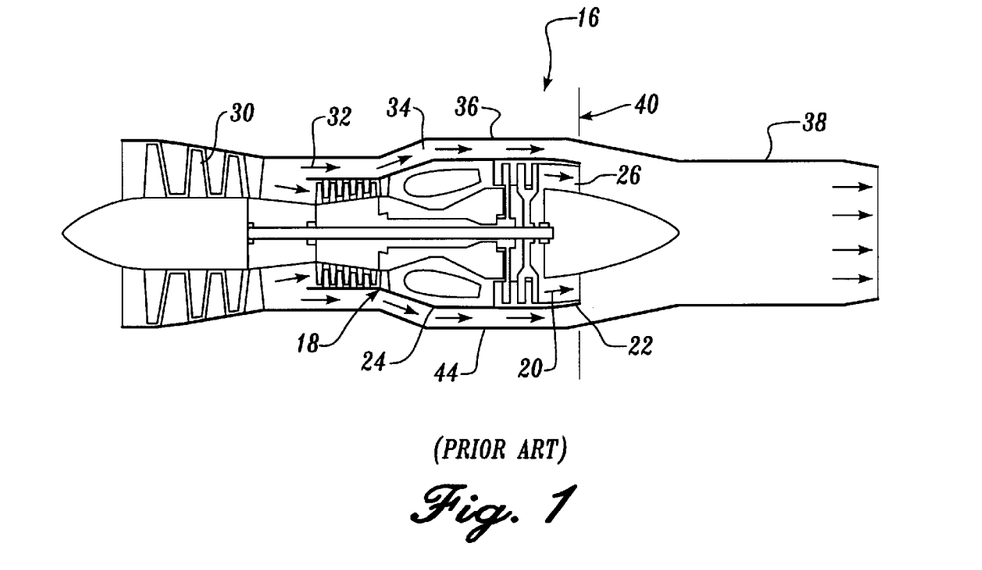
FIG. 1 is an axial, cross-sectional view illustrating a prior art turbofan engine in simplified fashion.

Referring to FIG. 1, turbofan engines 16 generally include a gas generator 18 which expels primary exhaust 20 from a primary exhaust nozzle formed from an end annulus 22 (also called a "free mixer" or "splitter"). The gas generator is encased in an engine casing 24 to which the end annulus 22 is attached. The area within the annulus 22 forms a primary duct 26. In applications having an engine plug 28, the primary duct is annular. A single or multi-stage fan 30 supplies a secondary or by-pass airstream 32 that flows through a fan duct 34 circumscribing the gas generator 18. The fan duct 34 extends generally between the engine casing 24 and an outer engine structure 36.

Some turbofan engines, especially those with lower bypass ratio, are of the variety in which the primary exhaust 20 and the bypass airstream 32 merge within a common exhaust nozzle 38 and are expelled jointly into the atmosphere to produce the necessary thrust. The merging of the primary and secondary airflows 20, 32 occurs just aft of the annulus 22, starting at what is termed a mixing or confluence plane 40.

Under certain circumstances, mixing the primary and secondary fluid streams can provide an increase in the overall engine thrust over that which would be produced by exhausting unmixed fluid streams. This thrust increase causes a desirable decrease in specific fuel consumption. The increase in thrust and decrease in fuel usage arises because the mixed gases have a higher mass velocity product than that which would be produced by separately exhausting the two fluid streams, i.e., a mixed-flow is propulsively more efficient. The benefits of forced mixing are the greatest at high speed flight and high engine power settings. The potential thrust gain from mixing is highest for low bypass ratio engines and diminishes with increasing bypass ratio.

An additional advantage of mixing secondary air with primary exhaust is a potential decrease in jet noise. Mixing these airflows reduces the velocity of the faster of the flows, usually the primary flow, and creates a more uniform mixed flow having a lower total velocity. This directly affects jet noise generated by the combining of the mixed flow with ambient air behind the common nozzle 38. Again, the benefit is highest for low bypass ratio engines. The mixing of primary and secondary airflows also reduces the peak exhaust gas temperature and therefore increase the selection of materials available for use in the common nozzle, potentially avoiding costly exotic materials. Lower temperatures may also eliminate the need for insulation or cooling and/or may reduce material gauges which can reduce exhaust system weight.

The annular convergence of fan and primary flows at the splitter 22, as shown in FIG. 1, allows some downstream mixing, but requires a very long duct within which to accomplish desirable amounts of mixing. Replacing the splitter with a forced mixer by adding a mixing device to the splitter can mix the two streams more completely over a shorter distance. The most commonly used forced mixer is the lobed mixer, sometimes referred to as a "daisy" mixer. Aspects of a mixing apparatus formed in accordance with the present invention are described herein with reference to a modified fan cascade mixer. Aspects of various forced mixers are discussed in U.S. Pat. Nos. 4,165,609 and 4,215,536.

In addition to mixing, some turbofan engines could benefit from an engine configuration that allows for differing amounts of primary exhaust and bypass airstreams. One such application would be a low bypass ratio engine for a supersonic transport. In order to avoid inlet spillage drag during supersonic flight, the engine should best be operated at a constant input air flow, even at lower engine power settings. This may be aided by changing the geometry of the fan guide vanes. Since fan airstream pressure and density decrease with decreasing engine power settings (without a decrease in mass flow), the fan duct 30, especially in the mixing plane, should increase in cross-sectional area. A nozzle having a mixing plane capable of varying the relative amounts of bypass airstream and primary exhaust would be useful in these cases. Such a configuration could additionally help during take-off and landing operations where the engines of a supersonic airplane operate at less than full power and engine jet noise is high. Optimally, a variable mixing area could be used to increase bypass ratio and maintain high engine corrected flow rates to reduce jet velocities.

Therefore a need exists for a mixing apparatus capable of mixing primary exhaust and secondary air, as well as varying the relative areas of the primary duct and fan duct at the mixing plane. The ideal mixing apparatus should be capable of sufficiently mixing the two fluid streams for realizing an increase in thrust, a decrease in engine noise, an increase in fuel efficiency, and a reduction in exhaust gas peak temperature. The present invention is directed to fulfilling this need.

SUMMARY OF THE INVENTION

The present invention mixing apparatus is provided for mixing initially separate gas flows, such as primary exhaust and secondary airflows, and for varying the ratio of cross-sectional areas of secondary and primary airflows in the mixing plane. A mixing apparatus formed in accordance with the present invention includes a segmented annulus attached to the engine generator casing. The annulus includes a plurality of segments of which at least a portion are movable segments. Each movable segment has an inboard position in which the ratio of secondary airflow cross-sectional area to primary exhaust cross-sectional area is increased at the mixing plane and an outboard position in which the ratio is decreased. The movable segments are rotated between positions by a total angle of preferably less than about 20 degrees. A number of mixing devices are connected to the annular segments. There are preferably between eight and 24 mixing devices. The mixing devices mix the primary and secondary gases. A repositioning assembly moves the movable segments between their inboard and outboard positions.

In accordance with other aspects of the present invention, a first preferred embodiment of the mixing apparatus includes a number of stationary segments interspersed between the movable segments in alternating fashion. Each stationary segment includes a mixing device formed of a fan cascade mixer having side walls that form the lateral sides of the stationary segment. Each movable segment includes a forward end and substantially parallel side surfaces that slide alongside the mixer side walls. The forward end of each movable segment is hingedly connected to the engine casing.

In accordance with still further aspects of the present invention, a second preferred embodiment of the mixing apparatus includes only movable segments having a forward end and opposed sides. The forward end is hingedly connected to the engine casing. The mixing devices are formed of fan cascade mixers that are attached to the movable segments. The second preferred embodiment further includes an expansion mechanism between the sides of adjacent movable segments for providing a seal between the movable segments when going between their inboard and outboard positions. One arrangement of expansion mechanism includes a recess located in one movable segment side and an insert located on the adjacent movable segment side surface, the insert being movably disposed in the recess at all times. In the second preferred embodiment, each mixing device is positioned midway along its respective movable segment and assumes approximately half of the arcuate length of the movable segment.

In accordance with still other aspects of the invention, the repositioning assembly includes a number of bell cranks, each having a proximal arm linked to a movable segment and a distal arm linked to a synchronization mechanism. The repositioning assembly further includes a number of actuators in communication with the synchronization mechanism. Activation of the actuators causes the synchronization mechanism to simultaneously move the bell cranks to cause simultaneous motion of the movable segments. A preferred repositioning assembly includes having a portion thereof positioned outside of either the primary or secondary airflows. A preferred synchronization mechanism includes an actuation ring.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The description below discusses two preferred embodiments of mixing apparatus formed in accordance with the present invention. The first preferred embodiment is discussed with reference to FIGS. 2–4. The second preferred embodiment is discussed with reference to FIGS. 5–8. The illustrations of FIGS. 9 and 10 may be employed in a mixing apparatus formed in accordance with the present invention, including the first and second preferred embodiments.

In general, the present invention includes a segmented end annulus 50 where upon at least a portion of the segments are movable segments 52 that rotate about an axis 53 between inboard and outboard positions 54, 56. The inboard position 54 decreases the primary duct cross-sectional area and increases the fan duct cross-sectional area at the mixing plane 40. In the opposite manner, the outboard position 56 increases the primary duct area and decreases the fan duct area at the mixing plane 40. Stationary segments 60 may be interspersed between the movable segments 52. A number of mixing devices 62 are attached to either or both of the movable or stationary segments 52, 60. Two preferred embodiments are described below.

The variable area mixing apparatus of the present invention may be employed in gas turbine engines having a wide variety of primary exhaust configurations. It is recommended that some type of center structure (e.g., plug assembly, exhaust cone, etc.) be present. A center structure can advantageously increase the penetration of fan air 32 into the primary exhaust 20 when used in conjunction with a mixing apparatus formed in accordance with the present invention.

Figure 2:
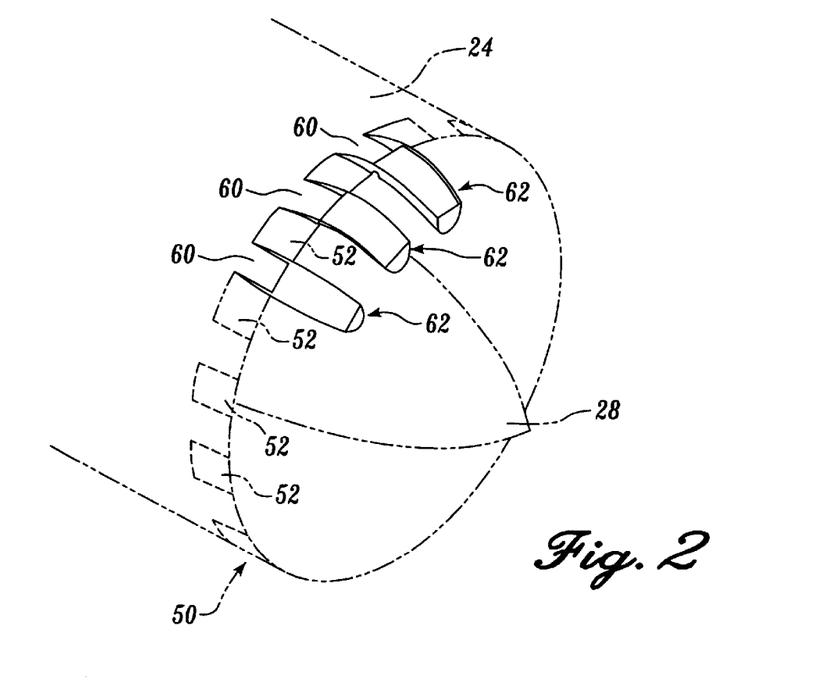
FIG. 2 is a simplified isometric view, partially drawn in phantom for clarity, illustrating a first preferred embodiment of a variable area mixing apparatus formed in accordance with the present invention, with portions omitted for illustrative purposes.

In more detail, referring to FIG. 2, a first preferred embodiment of a variable area mixing apparatus formed in accordance with the present invention is shown in perspective view. The segmented end annulus 50 includes both movable segments 52 and stationary segments 60. Mixing devices 62 are located at each of the stationary segments 60. The stationary segments 60 and the moving segments 52 have generally similar arcuate dimensions and are positioned about the annulus 50 in an alternating manner. Absolute segment sizes will depend on the number of mixing devices 62 used.

Figure 3A:
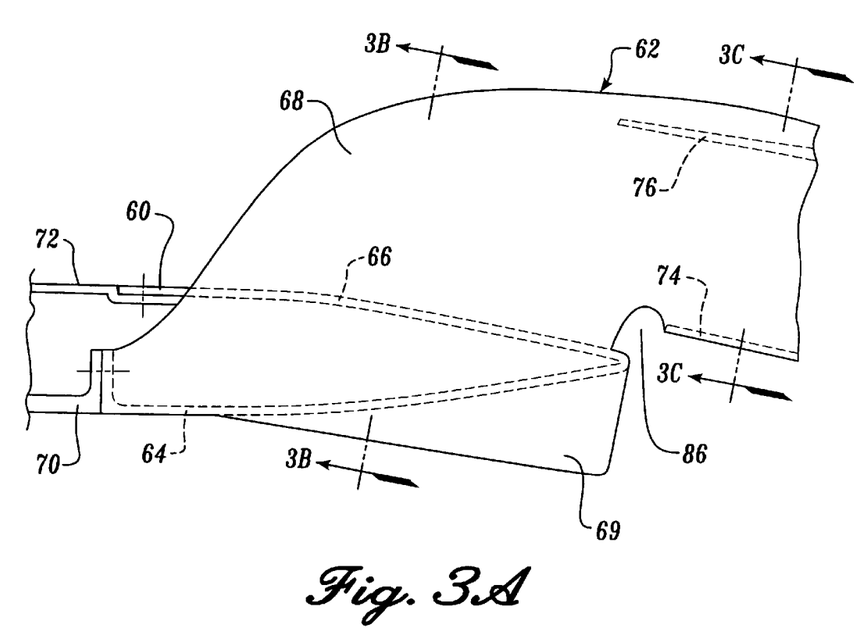
FIG. 3A is a side view of a mixing device formed in accordance with the present invention for use in the variable area mixing apparatus of FIG. 2.

Referring to FIG. 2, the stationary segments 60 of the first preferred embodiment are preferably built as separable segments, formed of inner and outer skins 64, 66 that are structurally integrated with their respective mixing devices 62. By making the mixing device and stationary segment a structurally integral unit, an operator may easily replace the segment if any portion becomes damaged. As shown in FIG. 3A, the mixing device is preferably a fan cascade mixer that includes opposed side walls 68. The fan cascade mixer as applied in the present invention is discussed in detail below. The fan cascade mixers are further structurally integrated with the stationary segments by using the side walls 68 to serve as end ribs for the stationary segment 60.

Figure 3B:
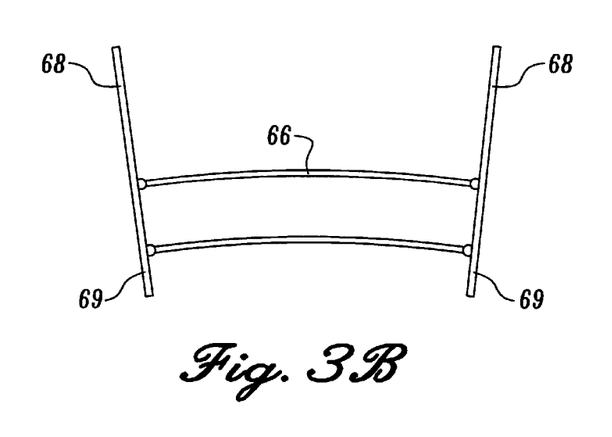
FIG. 3B is a first cross-sectional view of the mixing apparatus of FIG. 3A.

The stationary segments 60 are detachably connected to at least one structural member of the engine casing, such as an engine case rear flange 70. As shown in FIG. 3A for example, the mixing device side walls 68 and inner skin 64 are bolted to the rear flange 70, and the outer skin 66 is attached to an outboard surface 72 of the engine casing. The lateral edges of the inner and outer skins 64, 66 are attached (e.g., welded or brazed) to the side walls 68 so as to form a sealed seam, as shown in FIG. 3B. Referring back to FIG. 3A, the fan cascade mixer side walls 68 preferably extend inboard near the aft end of the stationary segments 60 to form a keel-like blade 69. This extension provides a sealing surface for the adjacent moving segment 52 during inboard travel, as described below.

Figure 3C:
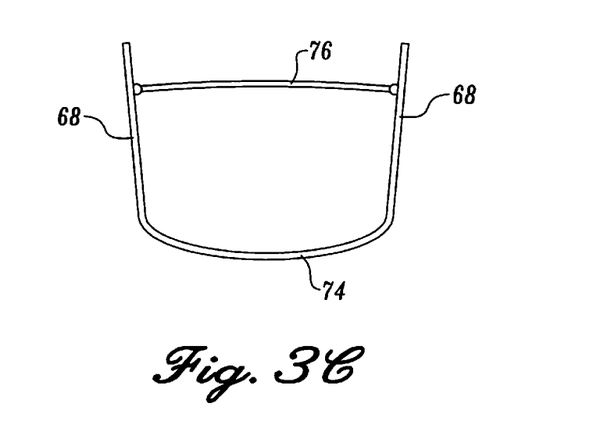
FIG. 3C is a second cross-sectional view of the mixing apparatus of FIG. 3A.

The mixing device illustrated in FIGS. 3A–3C is a modified fan cascade mixer and is intended to be representative of a wide variety of types of mixing devices that may be used in the present invention. See, for example, the myriad of mixing devices described in U.S. Pat. No. 4,165,609 and U.S. Pat. No. 4,215,536. Therefore, even though the fan cascade mixer illustrated in FIGS. 3A–3C is a preferred mixing device, it should be viewed as exemplary and not limiting. What is important to the present invention is that the mixing device selected must be substantially rigid in order to withstand the highly dynamic and hot internal engine airflow environment. The mixing device selected must additionally consist of elements that allow the variations in the mixing plane area without physical interference of movable parts. Lastly, it is preferred that the mixing device be capable of being integrally formed with its support segment.

The fan cascade mixer of FIGS. 3A–3C includes inboard and outboard turning vanes 74, 76. The inboard vane 74 is formed by reoriented extensions of the side walls 68. The outboard vane 76 is formed by welding or brazing a separate piece between the side walls 68 in a generally transverse manner. See FIG. 3C. The turning vanes 74, 76 and side walls 68 form a longitudinally tubular member 78 having an inner passage 80 (shown in FIGS. 3D and 4) extending between forward and aft openings 82, 84 (shown in FIG. 3).

A slight curvature to the tubular member 84 encourages the turning vanes 74, 76 to direct bypass air 32 radially inward toward the rearwardly-flowing primary exhaust 20. In response, the displacement of primary exhaust 20 caused by the injection of bypass air 32 causes primary exhaust to move radially outward through the spaces between the cascade mixers. This forms an alternating flow pattern desirable for efficient mixing. To facilitate the outward flow of primary exhaust around the cascades, the edges between the side walls 68 and the inboard turning vane 74 are progressively rounded in the direction toward the aft opening 84. See FIG. 4.

In addition, by using an inboard turning vane 74 that does not connect to the stationary segment inner or outer skins 64, 66, a small gap 86 may be formed forward of the inboard turning vane as shown in FIG. 3A. The gap 86 allows an initial amount of mixing to be accomplished due to bypass air 32 flowing into primary exhaust without traveling through the tubular member 78 of the fan cascade mixer.

As may be appreciated by those skilled in the art, positioning the mixing device in a region comprised substantially of fan airflow 32 instead of primary exhaust 20 (as is described above), advantageously reduces the temperature tolerance required of the mixing device, hence allowing for the use of potentially less exotic and less expensive mixing device materials. It is possible to use a reverse configuration wherein the mixing device is positioned in a primary exhaust region, however, this is not a preferred arrangement.

Figure 3D:
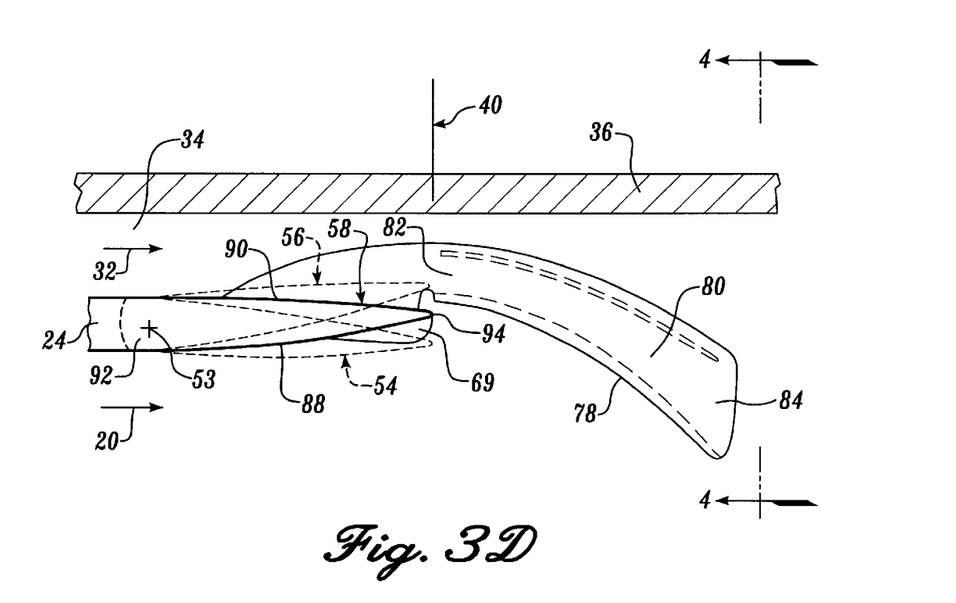
FIG. 3D is a side view of the mixing apparatus of FIG. 2 showing repositioned portions thereof in phantom line.

The movable segments 52 of the first preferred embodiment include smooth inner and outer airflow surfaces 88, 90, as shown in FIG. 3D. A movable segment forward end 92 rotatably attaches the segment to the engine casing 24. A movable segment trailing edge 94 is formed by the tapered joining of the inner and outer airflow surfaces 88, 90. The interior of each movable segment may be formed in various ways, e.g., hinging a structural support member to the engine rear flange 70 in a manner similar to the general arrangement described below with regard to the movable segment of the second preferred embodiment. Though the movable segments are circumferentially slightly arcuate, the forward end axis of rotation 53 is linear. A repositioning assembly 96 is provided for accomplishing rotation of the movable segments 52. One embodiment of a repositioning assembly is discussed below with reference to FIGS. 8 and 9. In the first preferred embodiment, the movable segments include an end rib that provides structural support to the segment as well as prevents airflow from entering the interior of the movable segment. The adjacent side walls 68 of the fan cascade mixer provide parallel surfaces for the movable segment to seal against. Where fan cascade mixers are not used or used differently than described above, similar additional sealing between the movable segment sides and the mixing device (or stationary segment) may be required.

Figure 4:
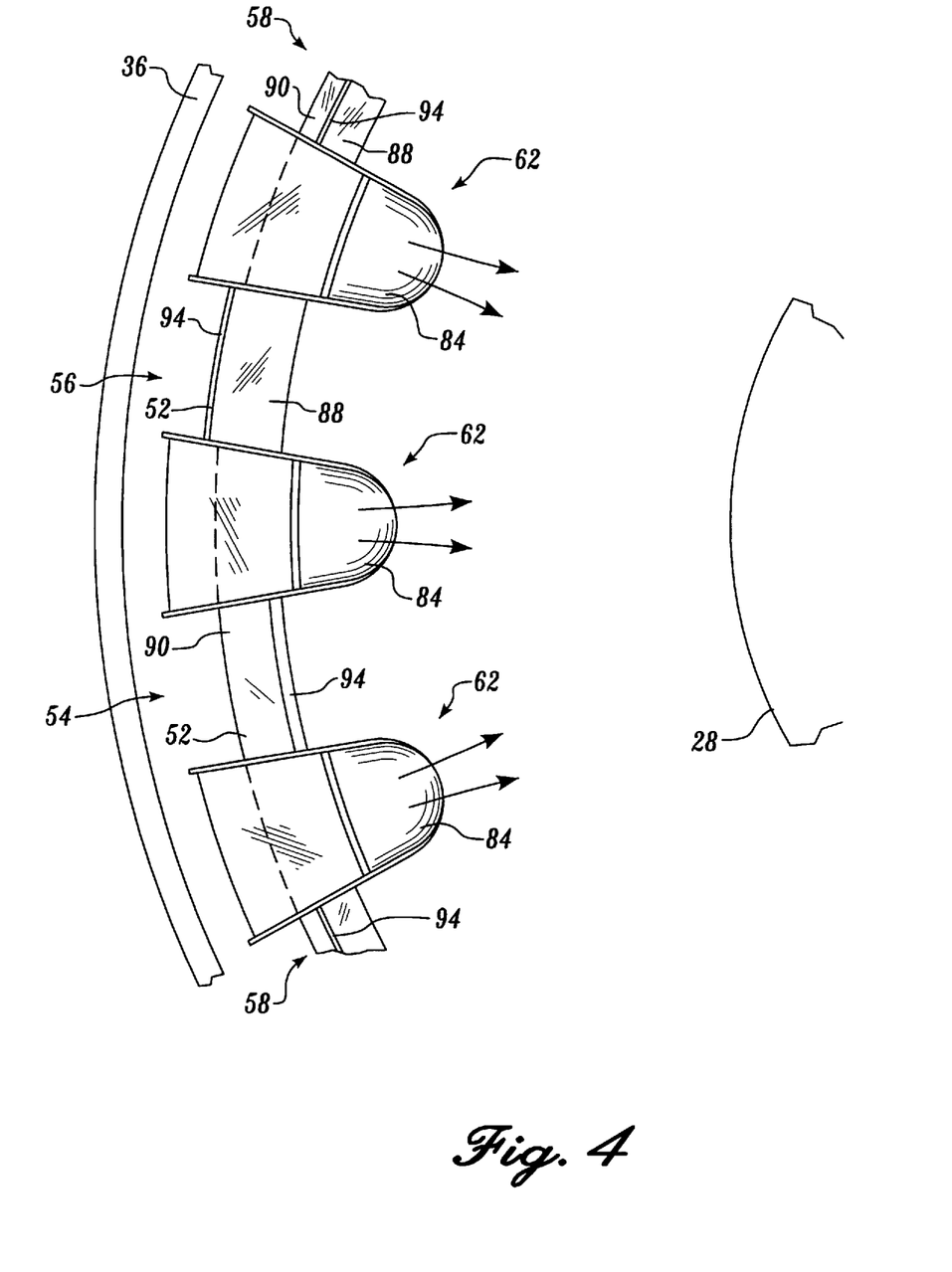
FIG. 4 is a rear view looking forward of the variable area mixing apparatus of FIG. 2 showing various positions that may be assumed during use.
Figure 5:
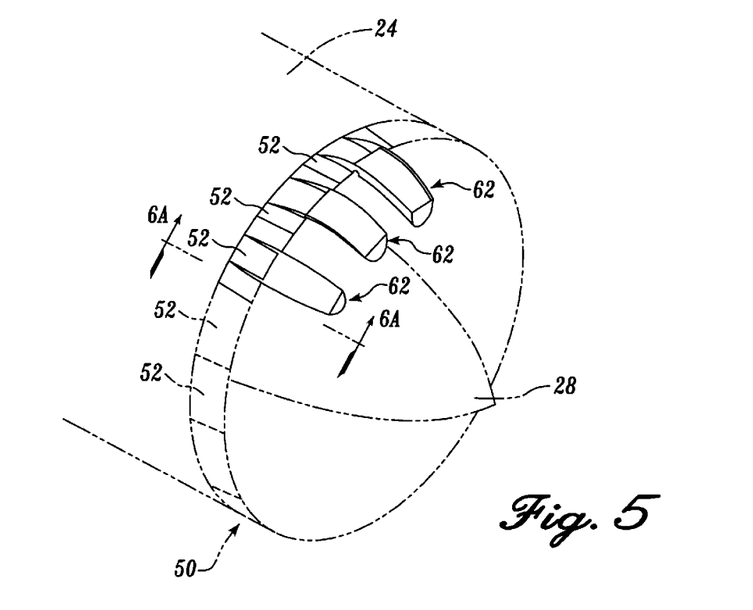
FIG. 5 is a simplified isometric view, partially drawn in phantom for clarity, illustrating a second preferred embodiment of a variable area mixing apparatus formed in accordance with the present invention, with portions omitted for illustrative purposes.

FIGS. 3D and 4 illustrate the inboard and outboard positions 54, 56 and a neutral position 58 of the movable segment of the first preferred embodiment mixing apparatus. In FIG. 3D the inboard and outboard positions 54, 56 are shown in phantom. In FIG. 4, all three positions are shown simultaneously. This depiction is for illustrative efficiency. During use, it is preferred that all movable segments move in unison and are moved to similar positions. Rotation of the movable segments 52 to their inboard position 54 causes an increase in the fan flow cross-sectional area and a decrease in the primary exhaust cross-sectional area at the mixing plane 40. Rotation to their outboard position 56 causes a decrease in the fan flow cross-sectional area and an increase in the primary exhaust cross-sectional area. Thus, the ratio of bypass to primary cross-sectional areas may be altered. The movable segment inboard and outboard positions 54, 56 are provided primarily to meet engine cycle requirements and should not adversely affect the functioning of the mixing devices 62.

Referring to FIG. 4, the arcuate size of the movable segments 52 will depend on the number of movable and stationary segments 52, 60 as well as their relative sizes. Factors such as flow separation and wall interference should be considered in determining these numbers. In one embodiment, it was determined that an outward angle of three degrees was the maximum amount available before the mixing device contacted the outer bypass duct wall. An inward angle of six degrees was the minimum amount available before flow separation became significant. The angles required to position the movable segment at its inboard and outboard positions should be, in general, relatively small, since a small variation in bypass duct cross-sectional area at the mixing plane 40 provides an equal and opposite change in the primary exhaust duct cross-sectional area. Even total angles of five to seven degrees have been determined sufficient to ensure a roughly 40% change in the cross-sectional area ratio in some applications. It is preferred that between about eight to 24 mixing devices be used with a corresponding number of stationary segments, a preferred number of mixing devices being 18. Additionally, a designer should consider coordinating the mixing devices 62 with downstream devices (such as nozzle ejectors) in order to optimize the various nozzle characteristics.

As a measure to further ensure smooth rotation of the movable segments 52, the interface between the movable segment and the stationary segment 60 is configured to allow the movable segment to easily move between its inboard and outboard positions 54, 56. This is most easily accomplished by forming the fan cascade mixer side wall at one edge of the movable segment 52 parallel to the fan cascade mixer side wall at the oppose edge of the movable segment 52. In addition to being parallel to each other, the fan cascade mixer side walls should be normal to the movable segment forward end axis of rotation. This combination of attributes allows the moving segments 52 to move inboard and outboard without interfering with the stationary segments 60 and/or mixing devices, while at the same time providing a tight seal between the stationary and movable segments 52 and 60.

Referring to FIGS. 5–8, a second preferred embodiment of a variable area mixing apparatus formed in accordance with the present invention is shown in perspective view. Shown in FIG. 7, the second preferred embodiment mixer apparatus also includes a plurality of mixing devices 62 attached at approximately equal distances about the end annulus 50. The annulus 50, however, includes only movable segments 52. The mixing devices 62 are attached to the movable segments. Because only movable segments are used in the second preferred embodiment, approximately twice the area ratio change may be obtained as compared with the first preferred embodiment.

Referring to FIGS. 6A–6D, each movable segment 52 of the second preferred embodiment is formed by rotatably attaching the forward ends of fan cascade mixer sidewalls 68 to lugs 108 connected to the engine casing 24 through the rear flange 70. Inner and outer skins 66', 68' connect to the fan cascade mixer. Instead of using the cascade mixer sidewalls as the side surfaces of the entire movable segment (as they are for the stationary segments as formed in the first preferred embodiment), the inner and outer skins 66', 68' are made to extend from both sides of the sidewalls 68 as shown in phantom in FIG. 6B. In general, the mixing devices 62 of the second preferred embodiment should occupy about the middle 50% of the arcuate width of each movable segment, with about 25% of the segment protruding to either side of the mixing device.

Figure 6A:
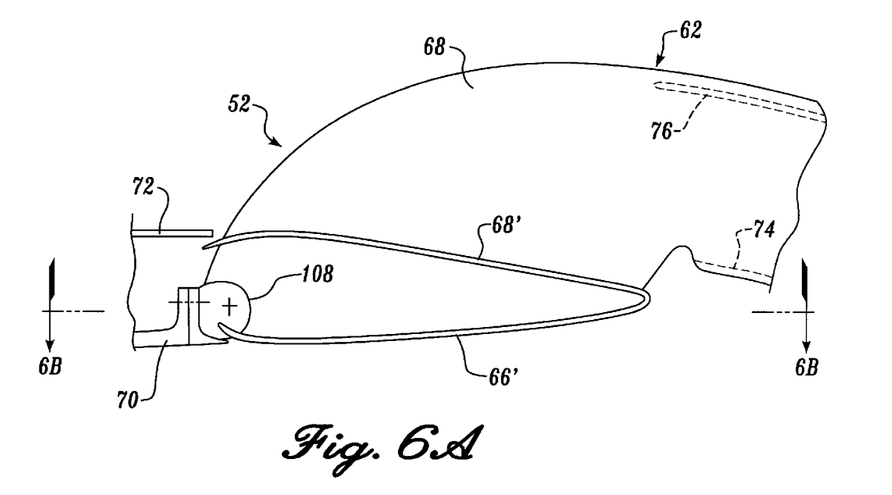
FIG. 6A is a side view of the variable area mixing apparatus of FIG. 5 showing repositioned portions thereof in phantom line.
Figure 6B:
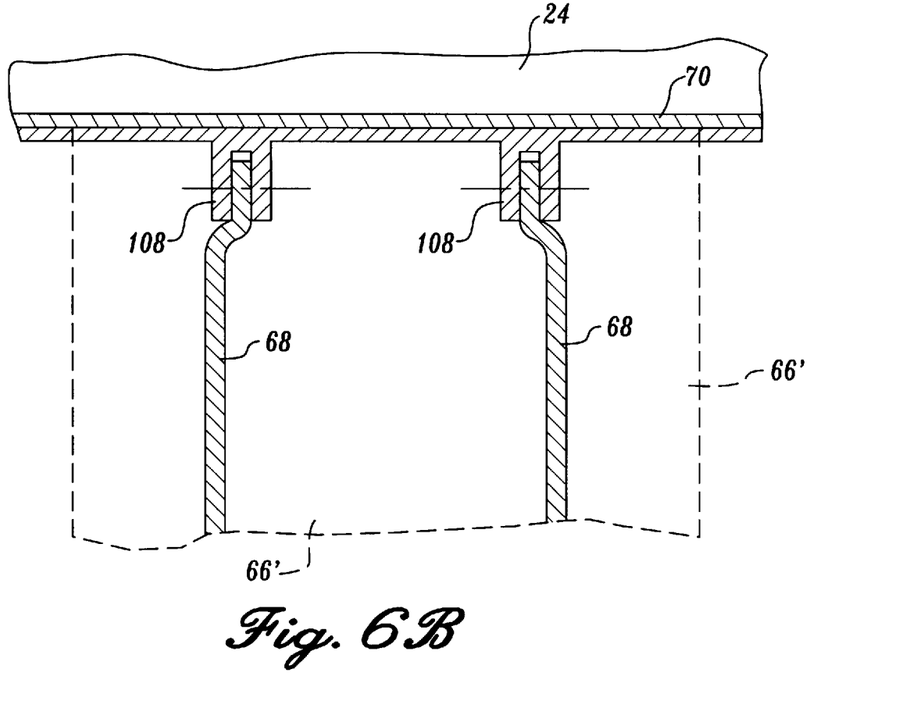
FIG. 6B is a top down cross-sectional view of the apparatus of FIG. 6A.
Figure 6C:
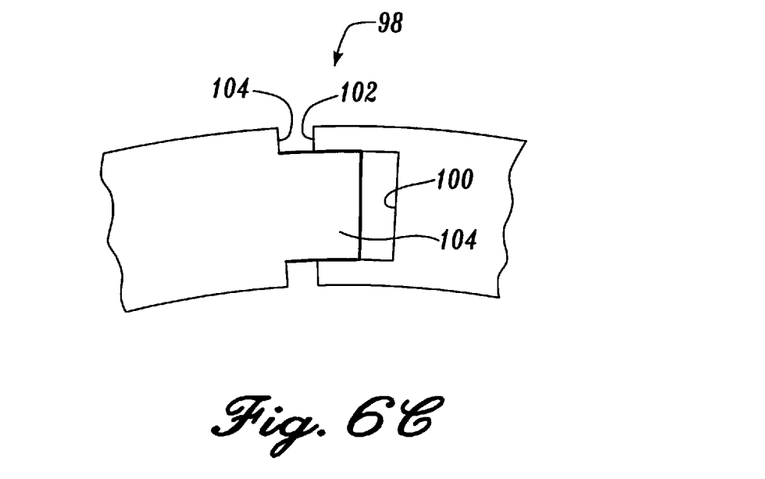
FIG. 6C is a detail of one embodiment of an expansion mechanism for use in the variable area mixing apparatus of FIG. 5.

An expansion mechanism or slip joint 98 is located between adjacent movable segments 52 in order to facilitate their relative motion. This mechanism 98 may be formed in any one of a number of ways. For example, the movable segments may be simply sized to fit closely when positioned inboard and in spaced-apart relation when positioned outboard, with a cover being attached to the outer surface of the inner shell and extending over each joint. By way of another example, known "iris" type engine arrangements may be used. FIG. 6C illustrates yet another example. A cavity 100 is formed in a side 102 of one movable segment to engage an insert 104 formed in an adjacent movable segment side 106. The insert 104 is fully encased in the cavity 100 when the movable segments 52 are in their inboard positions 54, and partially encased when in their outboard positions 56. It is preferred that a continuous annulus be maintained at all times in the mixing plane 40.

Figure 6D:
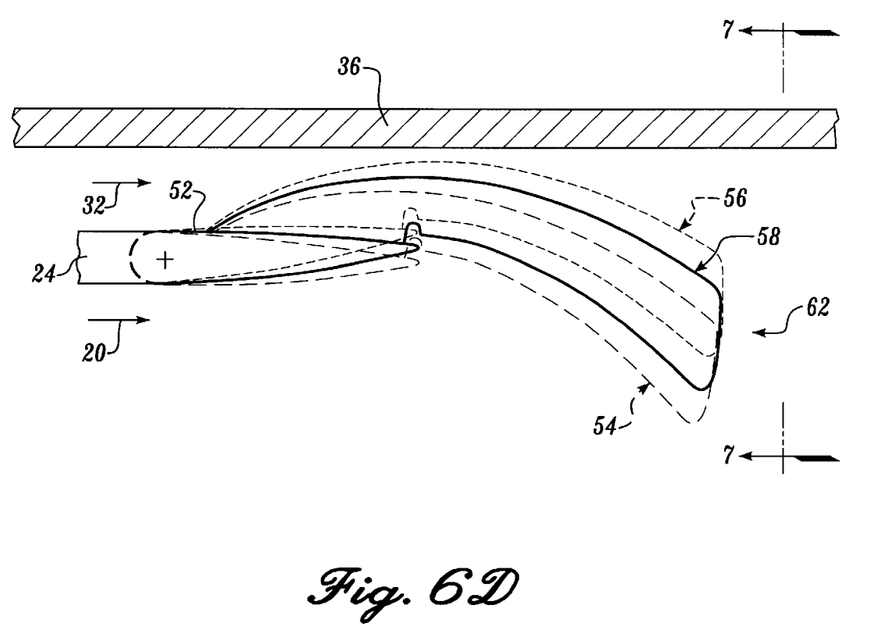
FIG. 6D is a side view of the mixing apparatus of FIG. 5 showing repositioned portions thereof in phantom line.
Figure 7:
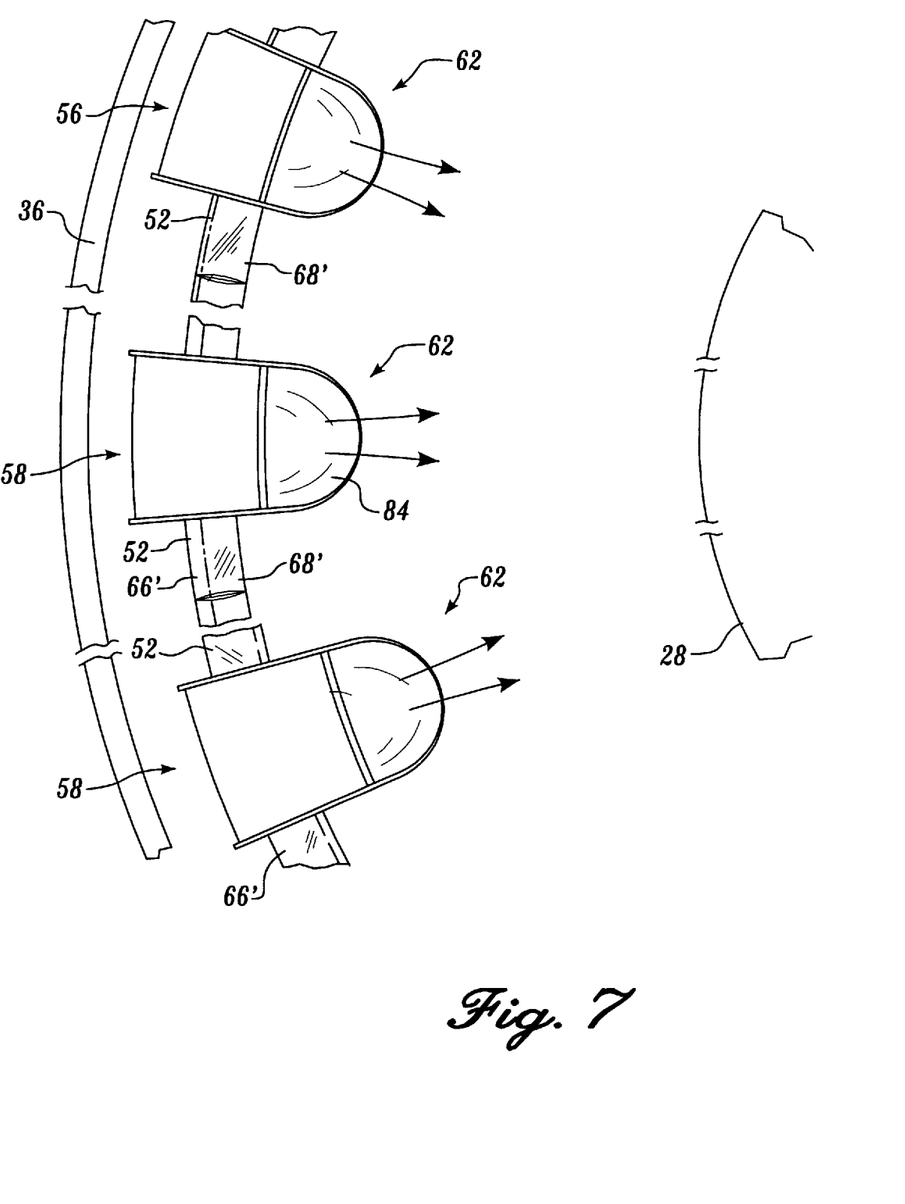
FIG. 7 is a rear view looking forward of the variable area mixing apparatus of FIG. 5 showing various positions that may be assumed during use.

FIGS. 6D and 7 illustrate the inboard and outboard positions 54, 56 and a neutral position 58 of the movable segment of the second preferred embodiment mixing apparatus. Rotation of the movable segments 52 to their inboard position 54 by the repositioning assembly 96 causes an increase in the fan flow cross-sectional area and a decrease in the primary exhaust cross-sectional area at the mixing plane 40. Rotation to their outboard position 56 causes the reverse area changes.

The repositioning assembly 96 for the movable segments 52 may be formed in various ways. Preferably, the selected assembly is located outside of the potentially hot and corrosive primary exhaust duct 25, thus adding to the reliability and service life of the assembly. It is also desirable to position the selected repositioning assembly 96 in a location that enjoys relatively easy maintenance access.

Figure 8:
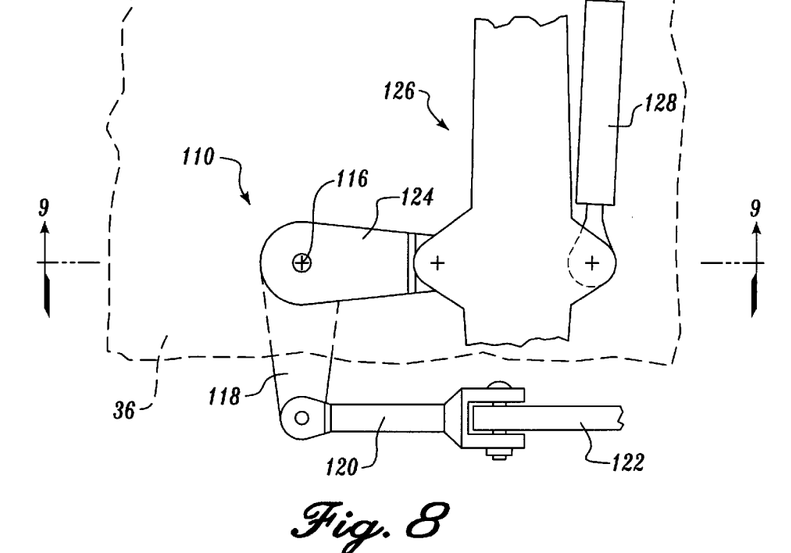
FIG. 8 is a plan view detail of one embodiment of a repositioning assembly for use in a variable area mixing apparatus formed according to the present invention.
Figure 9:
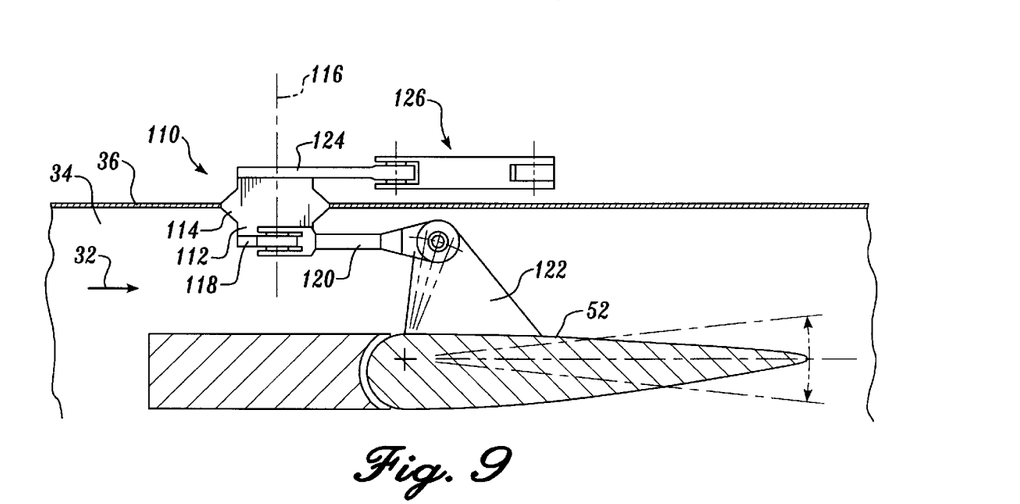
FIG. 9 is a side view of the repositioning assembly of FIG. 8.

One embodiment of a repositioning assembly is described with reference to FIGS. 8 and 9. The assembly includes a plurality of bell cranks 110, each having a drive shaft 112 which extends through the outer structure 36 and is secured thereto via a sealed circular bearing 114. A single drive shaft is provided for each movable segment 52. All drive shafts 112 are rotatable about axes 116 oriented generally radially relative to the engine longitudinal centerline. A proximal crank arm 118 interconnects between the drive shaft 112 and a drive link 120. The drive link 120 communicates rotational motion to a connection bracket 122 attached to the movable segment 52. A distal crank arm 124 interconnects between the drive shaft 112 and a synchronization mechanism 126, such as a circumferential ring. Some type of synchronization mechanism is preferred for ensuring the simultaneous actuation of all movable segments 52. A number of actuators 128 move the synchronization mechanism 126 to cause uniform motion of the bell cranks 110, and hence, the movable segments.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A mixing apparatus for mixing primary exhaust of a engine generator with secondary airflow at a mixing plane in an aircraft turbofan engine, the mixing plane including a cross-sectional primary exhaust area and a cross-sectional secondary airflow area, the mixing apparatus comprising:

(a) a plurality of segments connected to the gas generator of which at least a portion of the plurality of segments are movable segments, each movable segment having an inboard position for increasing the ratio of secondary airflow area to primary exhaust area, each movable segment having an outboard position for decreasing the ratio of secondary airflow area to primary exhaust area;

each movable segment comprising interconnected interior and exterior walls, each movable segment being rotatable connected to the gas generator;

(b) a number of mixing devices connected to the plurality of segments for mixing the primary exhaust and the secondary airflow; and (c) a repositioning assembly for moving the movable segments between their inboard and outboard positions.

2. The mixing apparatus according to claim 1, wherein the plurality of segments include a number of stationary segments interspersed between an equal number of movable segments; and where all of the mixing devices are attached to the stationary segments.

3. The mixing apparatus according to claim 2, wherein each movable segment includes a forward end and substantially parallel sides, the forward end being rotatably connected to the engine generator; and each mixing device is a fan cascade mixer having opposed sidewalls.

4. The mixing apparatus according to claim 1, wherein the number of mixing devices comprises at least one fan cascade mixer.

5. The mixing apparatus according to claim 1, wherein there are between about eight to 24 movable segments and between about eight to 24 stationary segments.

6. The mixing apparatus according to claim 1, wherein the interior and exterior walls are joined to form an airfoil shape in longitudinal cross-section.

7. The mixing apparatus according to claim 1, wherein the interior and exterior walls interconnect to define an interior region therebetween.

8. The mixing apparatus according to claim 1, wherein the movable segments are inwardly and outwardly rotatable and the outboard movable segment position extends into the secondary airflow area.

9. The mixing apparatus according to claim 8, wherein the movable segments are outwardly rotatable by a maximum amount of about 10 degrees.

10. The mixing apparatus according to claim 8, wherein the movable segments are inwardly rotatable by a maximum amount of about 10 degrees.

11. The mixing apparatus according to claim 8, wherein the movable segments can provide a change in secondary airflow to primary exhaust area ratio of up to about 40%.

12. A mixing apparatus for mixing primary exhaust of a engine generator with secondary airflow at a mixing plane in an aircraft turbofan engine, the mixing plane including a cross-sectional primary exhaust area and a cross-sectional secondary airflow area, the mixing apparatus comprising:

(a) a plurality of segments connected to the gas generator of which at least a portion of the plurality of segments are movable segments, each movable segment having an inboard position for increasing the ratio of secondary airflow area to primary exhaust area, each movable segment having an outboard position for decreasing the ratio of secondary airflow area to primary exhaust area;

(b) a number of mixing devices connected to the plurality of segments for mixing the primary exhaust and the secondary airflow; and (c) a repositioning assembly for moving the movable segments between their inboard and outboard positions; wherein the plurality of segments comprises only movable segments; and the mixing devices are attached to the movable segments.

13. The mixing apparatus according to claim 12, wherein each movable segment includes a forward end rotatably connected to the engine generator, each movable segment further including opposed sides; and each mixing device is a fan cascade mixer; the apparatus further including an expansion mechanism between movable segment sides for promoting smooth motion of the movable segments in going between their inboard and outboard position.

14. The mixing apparatus according to claim 13, wherein the movable segments are inwardly and outwardly rotatable.

15. The mixing apparatus according to claim 13, wherein the movable segments are outwardly rotatable by a maximum amount of about 5 degrees.

16. The mixing apparatus according to claim 13, wherein the movable segments are inwardly rotatable by a maximum amount of about 5 degrees.

17. The mixing apparatus according to claim 13, wherein each expansion mechanism is a slip joint wherein one side of a movable segment includes a cavity located at one movable segment side surface and an insert is located in the adjacent movable segment side surface, the insert being engagable in the groove; whereby during inboard movement of the movable segments, the insert becomes fully encased by the groove, and during outboard movement of the movable segments the insert becomes partially encased within the groove.

18. A mixing apparatus for mixing primary exhaust of a engine generator with secondary airflow at a mixing plane in an aircraft turbofan engine, the mixing plane including a cross-sectional primary exhaust area and a cross-sectional secondary airflow area, the mixing apparatus comprising:

(a) a plurality of segments connected to the gas generator of which at least a portion of the plurality of segments are movable segments, each movable segment having an inboard position for increasing the ratio of secondary airflow area to primary exhaust area, each movable segment having an outboard position for decreasing the ratio of secondary airflow area to primary exhaust area;

(b) a number of mixing devices connected to the plurality of segments for mixing the primary exhaust and the secondary airflow; and (c) a repositioning assembly for moving the movable segments between their inboard and outboard positions; wherein the repositioning assembly is partially located within a region exterior to the primary exhaust and secondary airflow gases.

19. A mixing apparatus for mixing primary exhaust of a engine generator with secondary airflow at a mixing plane in an aircraft turbofan engine, the mixing plane including a cross-sectional primary exhaust area and a cross-sectional secondary airflow area; the mixing apparatus comprising:

(a) a plurality of segments connected to the gas generator of which at least a portion of the plurality of segments are movable segments, each movable segment having an inboard position for increasing the ratio of secondary airflow area to primary exhaust area, each movable segment having an outboard position for decreasing the ratio of secondary airflow area to primary exhaust area; wherein the movable segments include a forward end pivotably attached to the engine generator;

(b) a number of mixing devices connected to the plurality of segments for mixing the primary exhaust and the secondary airflow; and (c) a repositioning assembly for moving the movable segments between their inboard and outboard positions; wherein the repositioning assembly comprises:

(i) a number of bell cranks, each having a proximal arm connected to a movable segment and a distal arm connected to a synchronization mechanism, the synchronization mechanism being interconnected to all bell cranks; and (ii) a number of actuators in communication with the synchronization mechanism, whereby activation of the actuators causes the synchronization mechanism to simultaneously move the bell cranks to cause simultaneous motion of the movable segments.

20. In a mixing apparatus for mixing primary exhaust of a engine generator with secondary airflow at a mixing plane in an aircraft turbofan engine, the mixing plane including a cross-sectional primary exhaust area and a cross-sectional secondary airflow area, the mixing apparatus including a number of stationary mixing devices connected to the gas generator in spaced apart relation, the mixing devices each including side wall members having exterior surfaces that extend into the secondary airflow area, the improvement comprising:

(a) a plurality of rotatable movable segments connected to the gas generator and located between mixing device side wall member exterior surfaces; each movable segment having inboard and outboard positions, the outboard position causing the movable segments to extend into the secondary airflow area, the inboard position causing the movable segments to extend into the primary exhaust area;

wherein the mixing device side wall member exterior surfaces are formed to extend into the primary airflow area, the movable segments maintaining contact with the side wall member exterior surfaces at all times in going between inboard and outboard positions; and (b) a repositioning assembly for moving the movable segments between their inboard and outboard positions.

21. The mixing apparatus according to claim 20, wherein the movable segment outboard position is about 10 degrees outward from the gas generator.

22. The mixing apparatus according to claim 20, wherein the movable segment inboard position is about 10 degrees inward from the gas generator.

23. The mixing apparatus according to claim 20, wherein the mixing apparatus is sized to provide a change in secondary airflow to primary exhaust area ratio of up to about 40% in going between the inboard and outboard positions.

* * * * *

UNITED STATES PATENT AND TRADEMARK OFFICE
CERTIFICATE OF CORRECTION

PATENT NO. : 5,771,681
DATED : June 30, 1998
INVENTOR(S) : P.K.C. Rudolph

Page 1 of 2

It is certified that error appears in the above-identified patent and that said Letters Patent is hereby corrected as shown below:

| COLUMN | LINE | |
|---|---|---|
| 8 (Claim 1, | 48 line 1) | "a" should read --an-- |
| 8 (Claim 1, | 62 line 15) | "rotatable" should read --rotatably-- |
| 9 (Claim 12, | 35 line 1) | "a" should read --an-- |
| 9 (Claim 13, | 62 line 8) | "position" should read --positions-- |
| 10 (Claim 17, | 12 line 25) | after "segments" insert --,-- |
| 10 (Claim 18, | 14 line 1) | "a" should read --an-- |
| 10 (Claim 19, | 35 line 1) | "a" should read --an-- |
| 10 (Claim 19, | 39 line 5) | "area;" should read --area,-- |

UNITED STATES PATENT AND TRADEMARK OFFICE
CERTIFICATE OF CORRECTION

PATENT NO. : 5,771,681
DATED : June 30, 1998
INVENTOR(S) : P.K.C. Rudolph

It is certified that error appears in the above-identified patent and that said Letters Patent is hereby corrected as shown below:

| COLUMN | LINE | |
|---|---|---|
| 10 (Claim 20, | 65 line 2) | "a" should read --an-- |

Signed and Sealed this

First Day of December, 1998

Attest:

BRUCE LEHMAN

Attesting Officer    Commissioner of Patents and Trademarks